United States Patent [19]

Beckstead et al.

[11] 4,351,808
[45] Sep. 28, 1982

[54] AUTOCLAVE SODA DIGESTION OF SCHEELITE CONCENTRATES

[75] Inventors: Leo W. Beckstead, Arvada; Dale K. Huggins; Paul B. Queneau, both of Golden, all of Colo.

[73] Assignee: Amax Inc., Greenwich, Conn.

[21] Appl. No.: 225,914

[22] Filed: Jan. 19, 1981

[51] Int. Cl.³ .............................................. C01G 41/00
[52] U.S. Cl. ........................................ 423/61; 423/53; 423/58
[58] Field of Search ............................. 423/53, 58, 61; 75/101 R

[56] References Cited

U.S. PATENT DOCUMENTS

| | | | |
|---|---|---|---|
| 2,351,678 | 6/1944 | Hall | 423/58 |
| 3,429,693 | 2/1969 | Bauer et al. | 423/61 |
| 4,092,400 | 5/1978 | Zbranek et al. | 423/58 |
| 4,167,555 | 9/1979 | Gomes et al. | 423/61 |

OTHER PUBLICATIONS

Grigoriu et al., "Chemical Absts.", vol. 61, 1964, #9209a.
Nasu, "Chemical Absts.", vol. 61, 1964, #5251a.
Zelikman et al., "Chemical Absts.", vol. 89, 1978, #133090p.

Primary Examiner—Herbert T. Carter
Attorney, Agent, or Firm—Michael A. Ciomek; Eugene J. Kalil

[57] ABSTRACT

A process for the soda ash digestion of scheelite concentrates is provided, the process comprising forming a slurry of a scheelite concentrate in an aqueous sodium carbonate solution and then digesting the slurry in an autoclave at an elevated temperature of at least about 180° C. The concentration of the $Na_2CO_3$ solution is substantially inversely correlated to the digestion temperature and substantially directly correlated to the $Na_2CO_3/WO_3$ weight ratio such as to effect the selective dissolution of at least about 95% of the $WO_3$ in the concentrate and provide a pregnant liquor containing $WO_3$ while inhibiting substantial dissolution of gangue minerals.

18 Claims, 5 Drawing Figures

4,351,808

AUTOCLAVE SODA DIGESTION OF SCHEELITE CONCENTRATES

This invention relates to a process for extracting tungsten from tungsten concentrates, for example, scheelite concentrates, and, in particular, to the soda ash digestion of substantially low-grade scheelite concentrates.

STATE OF THE ART

It is known to recover tungsten from its ores. Generally, the ore is concentrated by gravity and flotation methods and the concentrate thereafter treated to recover tungsten therefrom as a substantially pure compound.

One method which is applicable to ores of low tungsten content, as well as rich ores and concentrates, is disclosed in U.S. Pat. No. 2,351,678. The tungsten-containing material is finely ground and then subjected to dissolution in a solution of soda ash ($Na_2CO_3$). The dissolution of scheelite, for example, is carried out in the soda ash solution at an elevated temperature corresponding to a pressure of about 200 lbs/in$^2$ gauge or at about 380° F. to 390° F. (193° C.–199° C.) in a closed vessel, e.g., an autoclave. The pulp ratio employed in the autoclave may comprise 3 parts water to 1 part of flotation concentrate by weight. To the concentrate is added soda ash (sodium carbonate) generally in the amount of 2 parts or more to 1 part of $WO_3$ equivalent in the concentrate. The reaction results in a solution containing sodium tungstate ($Na_2WO_4$) and excess unreacted sodium carbonate, the time varying from about 2½ to 4 hours. Calcium carbonate forms as an insoluble precipitate. The excess sodium carbonate is subsequently neutralized with acid and the tungsten in solution converted to iron tungstate by the addition of ferrous sulfate.

Other methods known to the art for recovering tungsten from the solution include precipitation of tungstic acid by the addition of HCl or by solvent extraction.

One of the disadvantages of the aforementioned patented method is the relatively high consumption of soda ash and the rather high acid demand for subsequent neutralization which adds to the cost of the process. Another disadvantage is the tendency towards substantial dissolution of silica because of the relatively high concentration of soda ash employed.

Autoclave soda ash digestion of scheelite is well established commercially and is being used in several plants around the world to process off-grade scheelite concentrates. One plant has operated in California for some time in which scheelite concentrates of approximately 10% to 20% $WO_3$ have been treated using soda ash digestion. A similar soda ash digestion plant is operating in Austria. A disadvantage of such processes is the use of relatively large amounts of sodium carbonate at $Na_2CO_3/WO_3$ weight ratios of over 1.8:1 which tend to favor the dissolution of gangue minerals in the concentrate.

Recently, a particular low-grade scheelite concentrate which has presented problems is a concentrate produced by the Canadian Tungsten Mining Corporation. While certain of the concentrates are classified as "leachable" concentrates in that a dilute hydrochloric acid leach can produce a tungsten product containing 60% to 65% $WO_3$, others contain large amounts of silica minerals and proportionately smaller amounts of alkaline earth carbonates. Such concentrates appear to be unleachable in that dilute acid leaching improves the grade to only about 40% to 55% $WO_3$. These so-called "non-leachable" concentrates, while being capable of being digested in soda ash solution, presented the problem of yield; that is to say, dissolution yields were not always as high as desired, i.e., in excess of 95% dissolution yield, such as in excess of 97%. In addition, there was the problem of selectivity with regard to avoiding dissolution of substantial amounts of gangue minerals.

It would be desirable to provide an improved soda ash digestion process capable of treating tungsten concentrates, e.g., low-grade CanTung concentrates, with a relatively high degree of selectivity and consistently provide very high dissolution yields of the order of over about 95% and generally at least 97% and higher, e.g., at least about 98%, while inhibiting the dissolution of gangue minerals present, e.g., silica, among others.

The term "concentrate" employed herein is meant to include tungsten ores per se containing extractable amounts of $WO_3$.

OBJECTS OF THE INVENTION

It is thus an object of the invention to provide an improved method for the soda ash digestion of scheelite concentrate, for example, low-grade scheelite concentrate normally difficult to digest.

Another object is to provide a method for substantially completely digesting low-grade scheelite concentrated in an autoclave using an aqueous sodium carbonate solution of controlled concentration correlated to the $Na_2CO_3/WO_3$ weight ratio, aqueous tungsten concentration produced during digestion and digestion temperature, while inhibiting substantial dissolution of gangue minerals present.

These and other objects will more clearly appear when taken in conjunction with the following disclosure, the appended claims, and the accompanying drawings.

SUMMARY OF THE INVENTION

Figure 1:
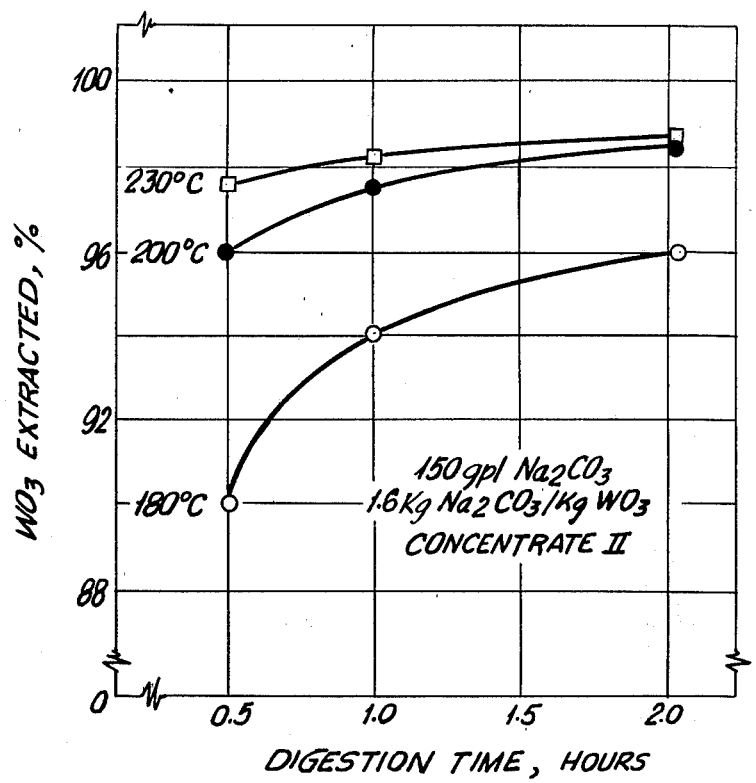
FIG. 1 depicts a series of curves showing the percent $WO_3$ extracted from concentrate II as a function of time for three digestion temperatures.

The invention provides an improved process for the soda ash ($Na_2CO_3$) digestion of scheelite concentrates, particularly low-grade scheelite concentrates containing about 2% to 40% $WO_3$, generally about 5% to 30%

WO₃, e.g., about 10% to 20%. However, the invention is also applicable to high grade concentrates and may be employed broadly in the treatment of concentrates containing about 2% to 70% by weight $WO_3$.

The process is based on the discovery of a surprising interaction between soda ash concentration, the $Na_2CO_3/WO_3$ weight ratio, the aqueous tungsten concentration in the pregnant liquor, and the temperature employed in the digestion of scheelite concentrates in aqueous soda ash solution.

The recognition of the interrelationships between the aforementioned four parameters has made it possible (1) to reduce substantially the amount of soda ash required to attain the desired tungsten extraction, (2) to minimize the excess soda ash in the pregnant liquor, (3) to provide maximum extraction yield of the tungsten, and (4) to provide maximum concentration of $WO_3$ in the pregnant liquor, while inhibiting substantial dissolution of gangue minerals. The maintenance of a low quantity of soda ash in the autoclave discharge pregnant liquor is important in that as the quantity of soda ash discharged increases, so does the subsequent sulfuric acid demand, the volume of gas to be scrubbed during $MoS_3$ precipitation and also the amount of sodium sulfate in the solvent extraction raffinate.

One embodiment of the invention comprises forming a slurry of scheelite concentrate in an aqueous sodium carbonate solution of initial concentration ranging from about 50 gpl to 200 gpl (grams per liter) at a relatively low $Na_2CO_3/WO_3$ weight ratio of about 0.9 to 1.6 and then digesting said slurry in an autoclave at an elevated temperature ranging from about 180° C. to 310° C., e.g., about 200° C. to 250° C., preferably from about 200° C. to 235° C.

Improved process efficiency is obtained by employing the $Na_2CO_3$ concentration of the leach solution in substantially inverse relationship with the digestion temperature and in substantially direct relationship with the $Na_2CO_3/WO_3$ weight ratio, the relationship selected being such as to effect the consistent dissolution of at least about 95% of the $WO_3$ in the concentrate, preferably at least about 97%, and provide a pregnant liquor containing said $WO_3$. By employing the foregoing relationship, the alkalinity can be controlled to levels favorable to the substantial inhibition of gangue minerals, such as gangue containing one or more of CaO, $SiO_2$, calcium fluoride, etc. We have found that the presence of magnesium in the form of a magnesium-containing compound is very helpful in inhibiting substantially the dissolution of silica. The magnesium compound may be naturally present or deliberately added as dolomite. The amount of magnesium present may range from about 2% to 10% by weight of the concentrate, and preferably from about 4% to 6% by weight.

It is preferred that the soda ash concentration range from about 75 gpl to 175 gpl and more preferably from about 75 gpl to 150 gpl. Likewise, the $Na_2CO_3/WO_3$ weight ratio may range from about 1 to 1.4.

Tests have shown that the higher the digestion temperatures, the less is the amount of soda ash needed to achieve high tungsten extraction and the greater is the $WO_3/Na_2CO_3$ ratio in the pregnant solution. It has been observed that the higher the initial concentration of $Na_2CO_3$, the higher the weight ratio of $Na_2CO_3/WO_3$ needed to obtain $WO_3$ extraction in excess of 95%, e.g., at least about 97% or 98%. By controlling the $Na_2CO_3/WO_3$ weight ratio, pregnant liquors containing up to about 130 or 140 gpl of $WO_3$ are obtainable.

At constant initial $Na_2CO_3$ concentration, it has been observed that increasing the $Na_2CO_3/WO_3$ weight ratio increases the percent $WO_3$ extracted to a certain maximum, and that further increases in $Na_2CO_3$ decreases extraction.

It has further been observed that increasing the aqueous tungsten concentration in the pregnant liquor without a corresponding increase in $Na_2CO_3$ concentration can sharply decrease $WO_3$ extraction. However, the inhibiting effect of high tungsten concentration decreases as temperature is increased.

DETAILS OF THE INVENTION

The improved process has demonstrated that the invention is particularly applicable to the soda ash pressure digestion of difficult-to-leach low-grade scheelite referred to herein as CanTung concentrates containing by weight at least about 2% and preferably from about 5 to 30% $WO_3$. However, as previously stated, the invention is applicable to low-grade scheelite concentrates containing about 2% to 40% $WO_3$ as well as high-grade scheelite concentrates. The scheelite concentrates generally contain gangue minerals, such as at least about 2% silica and up to about 30% CaO, and may or may not contain magnesium in the form of a magnesium-containing compound.

The improved process applied to such CanTung concentrates has resulted in 99.7% solubilization of tungsten with a relatively low $Na_2CO_3$ concentration of 75 gpl at a relatively high temperature of 230° C. Soda ash consumption was 1.2 kg/kg $WO_3$ during the two-hour digestion. Tungsten extraction exceeded 90% after one-half hour, even at 180° C., the lowest temperature tested. In contrast, consistently high extractions were not obtainable following process conditions practiced commercially by others, such as in California.

The CanTung concentrates which have been treated using the known California process are as follows:

TABLE I

| | WT % of Sample | |
|---|---|---|
| | (I) | (II) |
| $WO_3$ | 30.0 | 31.7 |
| CaO | 28.6 | 34.0 |
| $SiO_2$ | 10.6 | 5.7 |
| F | 0.96 | 1.08 |
| Mo | 0.04 | 0.016 |
| Mg | — | 2.3 |

The results obtained with the California process are given below.

TABLE II

| California Process | |
|---|---|
| Temp. °C. | 190 |
| Solids, % | 27 |
| Time, hrs. | 2 |
| Initial $Na_2CO_3$ Conc., gpl | 250 |
| $Na_2CO_3/WO_3$ Weight ratio | 1.9 |
| % $WO_3$ Extraction | |
| (I) | 92 |
| (II) | 96 |
| Slurry Caking | Slight |

Concentrate No. (I) had a particle size of 79.5% minus 400 mesh, while No. (II) was 79% minus 400 mesh.

As will be noted, the California process resulted in a dissolution yield for concentrate No. (II) of less than 97%, with CanTung concentrate No. (I) providing a lower dissolution yield of 92%.

The pressure digestion runs were conducted in a Parr two-liter titanium autoclave. A single 5.8 cm diameter, 6-bladed pitch-blade radial turbine impeller located 2.5 cm off the reactor bottom was used to agitate the slurry. Heat was provided by an electric heating mantle. A run was begun by adding a charge of concentrate to the reactor along with enough sodium carbonate solution to give the desired carbonate concentration and a slurry concentration of the desired percent solids. The slurry was agitated at 600 rpm and heat was applied to the system. Approximately one-half to three-quarters of an hour was required to reach the desired temperature. Timing of the test began as soon as the temperature was reached. At the end of the run, the reactor was placed in a water bath, which cooled the slurry to approximately 70° C. The slurry was filtered hot with the solids being repulped and filtered three times using distilled water. The weight of wash water used in each repulp step was approximately 1.0 to 1.2 times the weight of solid residue. Analysis of the washed leach residue enabled calculation of tungsten extraction.

Flotation reagent removal from dry feed concentrate (i.e., deoiling) was achieved in an electrically heated 3" diameter quartz kiln having a 12" hot zone, equipped with lifters, and rotating at 1 rpm. This kiln was horizontal, operated batchwise using 100 to 300 g charges of concentrate, and had a gas (air or oxygen) space rate throughput of 2.3 ft/minute at atmospheric pressure (Denver, Colorado). An alternative method for deoiling involved use of an oxygen overpressure during digestion. (Organic compounds were converted to $H_2O$, $CO_2$ and sodium acetate.)

In carrying out one embodiment of the invention as applied to concentrate No. (II), the soda ash stoichiometry was calculated based on Reaction 1 as follows:

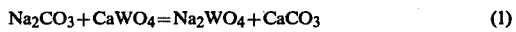

$$Na_2CO_3 + CaWO_4 = Na_2WO_4 + CaCO_3 \qquad (1)$$

The amount of reagent addition is referred to as either percent stoichiometric excess or as weight ratio of $Na_2CO_3/WO_3$ (kg/kg). Using Reaction 1, a 300% stoichiometric excess is equivalent to four times the stoichiometric amount of $Na_2CO_3$, and results in a 1.83 kg/kg weight ratio of $Na_2CO_3/WO_3$. The stoichiometric equivalent is 0.457 kg $Na_2CO_3$/kg $WO_3$.

The effect of the various parameters in achieving the results of the invention will be apparent from the following.

Effect of Temperature and Time

The results obtained on CanTung concentrate (II) at 2 hours of digestion are as follows:

TABLE III

| Temp., °C. | $Na_2CO_3/WO_3$ kg/kg | Initial $Na_2CO_3$,gpl | Solids, % | $WO_3$ Extn., % |
|---|---|---|---|---|
| 180 | 1.2 | 75 | 16 | 92.4 |
| " | 1.6 | 150 | 21 | 96.0 |
| " | 2.0 | 225 | 24 | 98.3 |
| 200 | 1.2 | 75 | 16 | 95.2 |
| " | 1.6 | 150 | 21 | 98.6 |
| " | 2.0 | 225 | 24 | 98.3 |
| 230 | 1.2 | 75 | 16 | 99.7 |
| " | 1.6 | 150 | 21 | 98.7 |
| " | 2.0 | 225 | 24 | 97.8 |

Figure 5:
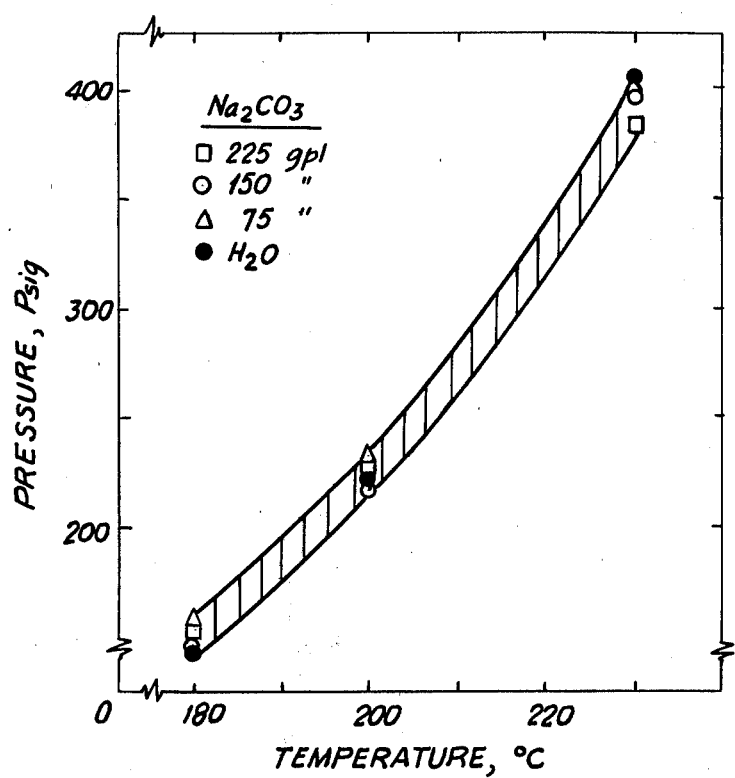
FIG. 5 depicts a narrow band curve showing autoclave pressure (psig) as a function of temperature and soda ash concentration over the range of approximately 180° C. to 230° C. at pressures ranging from approximately 145 to 405 psig.

At initial low soda ash addition, increasing the temperature from 180° C. up to 230° C. sharply increases tungsten extraction (i.e., from 92.4% up to 99.7%). At intermediate soda ash amounts (i.e., 1.6 kg/kg), extraction also increased with increasing temperature, but to a lesser extent. At high initial addition of soda ash, it will be noted that tungsten extraction essentially remained constant with increasing temperature. Thus, a range of 0.9:1 to 1.6:1 is preferred for the $Na_2CO_3/WO_3$ ratio, e.g., 1:1 to 1.4:1. The autoclave pressure at various temperatures and soda ash concentrations is shown in FIG. 5, the pressures ranging from about 145 to 405 psig over the temperature range of about 180° C. to 230° C. and higher. Broadly, for temperatures ranging from about 180° C. to 300° C. or 310° C., the pressure may range from about 145 to 1245 or 1430 psig. At a temperature range of about 200° C. to 250° C., the pressure may range from about 225 to 575 psig.

The effect of time on the amount of $WO_3$ extraction at three digestion temperatures is shown in FIG. 1. Tungsten extraction exceeded 90% after one-half hour, even at the lowest temperature tested (i.e., 180° C.). At the higher temperatures, the effect of time is less pronounced than at 180° C. In obtaining maximum dissolution, a reaction time of two hours is indicated.

The parameters are correlated to provide a $WO_3$ extraction of at least 95% and, in particular, at least about 98% of the total content of $WO_3$ in the concentrate.

The Effect of Soda Ash Concentration

Table IV shows some of the data from Table III along with additional data presented to illustrate the effect of initial soda ash concentration at constant $Na_2CO_3/WO_3$ weight ratio for concentrate (II) of 1.2 at a digestion time of 2 hours.

TABLE IV

| Initial $Na_2CO_3$,gpl | Temp., °C. | Solids, % | $WO_3$ Extn., % |
|---|---|---|---|
| 75 | 180 | 16 | 92.4 |
| " | 200 | " | 95.2 |
| " | 230 | " | 99.7 |
| 150 | 180 | 27 | 87.9 |
| " | 200 | " | 94.2 |
| " | 230 | " | 97.6 |
| 225 | 200 | 34 | 90.0 |
| " | 230 | " | 91.8 |

Figure 2:
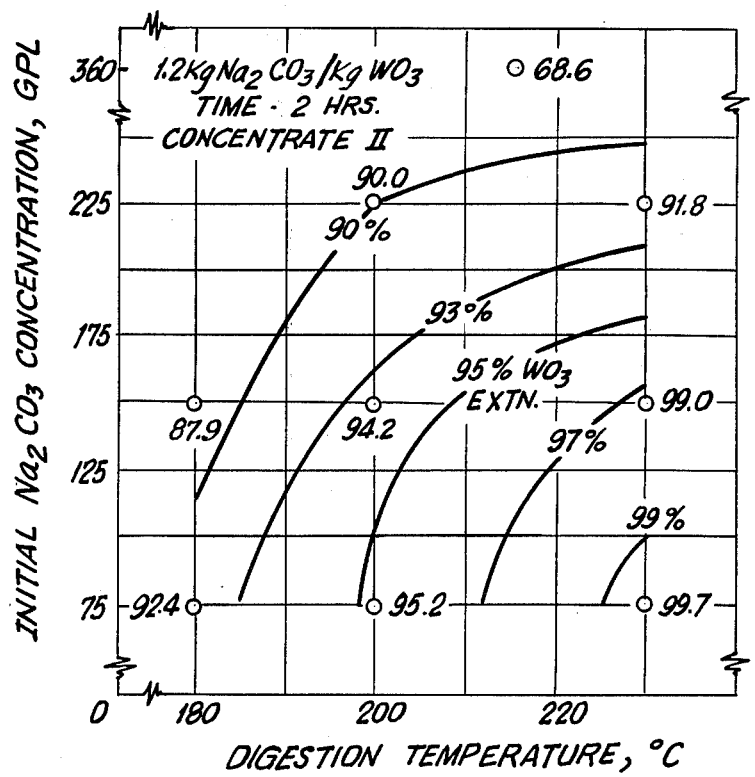
FIG. 2 is a contour diagram illustrating the effects of temperature and soda ash concentration on the percent $WO_3$ extracted from concentrate II at a weight ratio of about 1.2.

As will be apparent, increasing $Na_2CO_3$ concentration from 75 up to 150 gpl decreases $WO_3$ extraction at a given temperature. A further increase in soda ash concentration had a similar negative effect. The interaction of soda ash concentration and temperature is shown in FIG. 2. The benefit of operating the digestion step at a low initial $Na_2CO_3$ concentration and high temperature is clearly apparent from FIG. 2.

Effect of the $Na_2CO_3/WO_3$ Ratio

Figure 3:
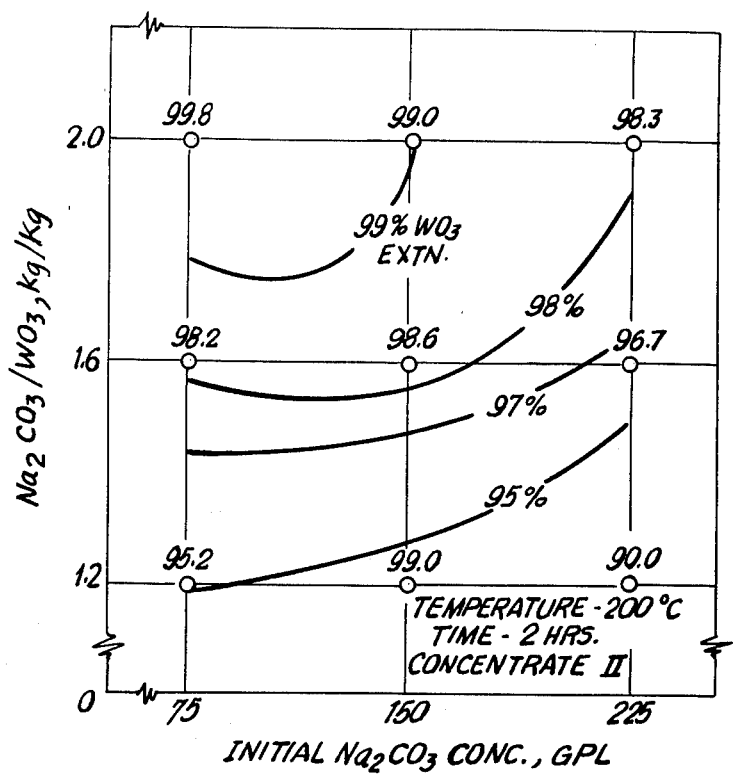
FIG. 3 is a contour diagram showing the effects of initial $Na_2CO_3$ concentration and the $Na_2CO_3/WO_3$ weight ratio on the percent $WO_3$ extracted at 200° C. and a digestion time of 2 hours from concentrate II.

FIG. 3 shows the effect of $Na_2CO_3/WO_3$ ratio (i.e., kg of soda ash per kg of $WO_3$ in the CanTung concentrate feed) on tungsten extraction at three levels of initial soda ash concentration at 200° C. for 2 hours. At a constant initial concentration of $Na_2CO_3$, increasing the $Na_2CO_3/WO_3$ weight ratio (i.e., reducing percent solids) results in increased extraction. At a constant initial weight ratio of $Na_2CO_3/WO_3$, increasing the initial concentration of $Na_2CO_3$ generally results in decreased extraction of $WO_3$.

Figure 4:
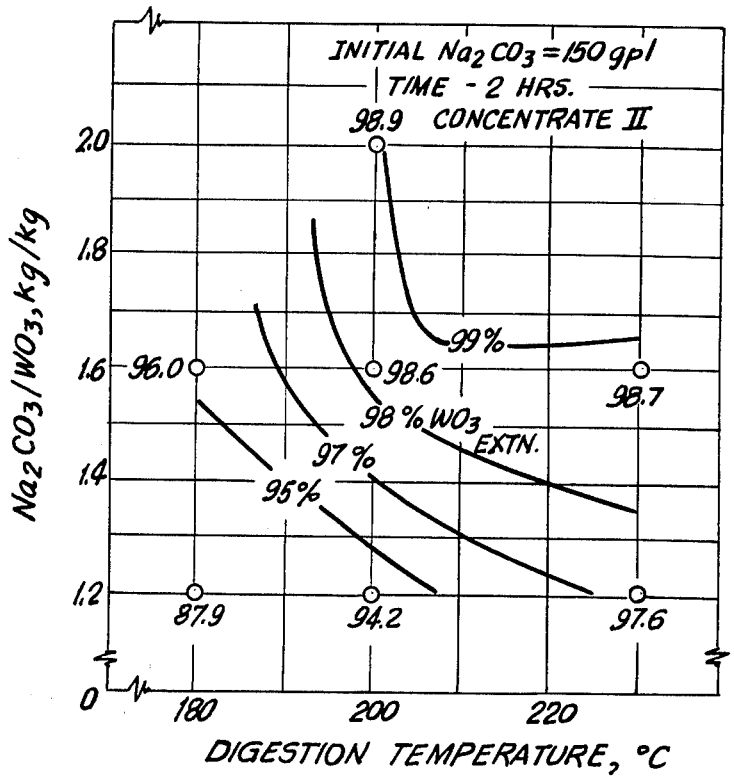
FIG. 4 depicts a contour diagram illustrating the effects of temperature and the $Na_2CO_3/WO_3$ weight ratio on the percent $WO_3$ extracted from concentrate II at an initial $Na_2CO_3$ concentration of 150 grams/liter (gpl) for 2 hours.

The interaction of temperature and $Na_2CO_3/WO_3$ weight ratio is illustrated by FIG. 4. Increasing the temperature and weight ratio of $Na_2CO_3/WO_3$ increases extraction of $WO_3$ to a certain extent. However, the beneficial effect of high temperature begins to diminish at high $Na_2CO_3/WO_3$ weight ratios. This effect was previously discussed in relation to the data of Table III.

It is clearly apparent that there is a substantial difference between the improved process of the invention and the commercial California process referred to herein.

Significance of Digestion Temperature

Throughout the study using the preferred embodiment of the invention, the results have shown that for initial concentrations of $Na_2CO_3$ of 75 to 150 gpl, and for fixed amounts of $Na_2CO_3$ and fixed reaction times, higher temperatures (200° to 230° C. or 250° C.) achieve higher extractions. At the same time, for a fixed concentration of $Na_2CO_3$, a fixed temperature, and a fixed reaction time, larger amounts of $Na_2CO_3$ (larger $Na_2CO_3/WO_3$ ratios) achieve higher extractions. Therefore, for a given reaction time, the amount of $Na_2CO_3$ employed can be reduced by increasing the temperature of reaction.

Reference is made to Table V below which shows the effect of increasing $Na_2CO_3$ addition on the percent extraction of $WO_3$ when digesting a CanTung gravity concentrate containing 29.0% $WO_3$ and 0.02% Mo, with 66.9% of the concentrate at minus 400 mesh, the digestion being carried out at 230° C. for 2 hours.

TABLE V

| $Na_2CO_3/WO_3$ wt. ratio | Initial $Na_2CO_3$,gpl | % Extraction $WO_3$ |
|---|---|---|
| 1.2 | 150 | 97.3 |
| 1.4 | 175 | 98.9 |
| 1.6 | 200 | 99.8 |
| 1.8 | 225 | 96.6 |
| 2.0 | 250 | 95.6 |

As will be noted, a very good extraction (99.8%) is obtained at a $Na_2CO_3/WO_3$ ratio of about 1.6 and an initial $Na_2CO_3$ concentration of about 200 gpl. In this connection, it is preferred that the initial $Na_2CO_3$ concentration range from about 50 gpl to about 200 gpl over the $Na_2CO_3/WO_3$ range of about 0.9 to 1.6, and preferably from about 75 to 175 gpl of initial $Na_2CO_3$ concentration to insure selective leaching of $WO_3$ while inhibiting gangue dissolution.

By controlling the parameter relationships in the manner stated herein, substantial dissolution of gangue minerals can even be inhibited at elevated temperatures. This is confirmed by a test conducted (note Table VI below) to illustrate the effect of increased temperature on impurity dissolution ($SiO_2$, P and F) when using sufficient soda ash to attain about 99% $WO_3$ extraction.

TABLE VI

| | Impurity Dissolution, ppm | | |
|---|---|---|---|
| | 180° C. | 200° C. | 230° C. |
| $SiO_2$ | 39 | 36 | 37 |
| P | 1 | 1 | 1 |
| F | 3400 | 3400 | 3000 |

*Sufficient $Na_2CO_3/WO_3$ weight ratio was provided at each temperature to attain 99% $WO_3$ extraction; the ratios were 1.8 at 180° C., 1.5 at 200° C., and 1.2 at 230° C. In each case, sufficient concentrate was digested for two hours to attain 120 gpl $WO_3$ at temperature, the concentrate containing by weight 13.9% $WO_3$, 5.2% Mg, 2.2% $SiO_2$ and a particle size distribution of which 73% was minus 400 mesh.

According to the table, in treating a concentrate containing 13.9% by weight of $WO_3$ for two hours at temperatures of 180° C., 200° C. and 230° C., respectively, using an amount of concentrate to produce 120 gpl $WO_3$, the amount of silica dissolution was inhibited to 39, 36, and 37 ppm, respectively, despite the higher temperatures employed.

Generally, increased temperature may result in substantially increased silica dissolution. However, this effect is minimal in the soda ash process of the invention due to the decreased $Na_2CO_3$ requirements at higher reaction temperatures. Less $Na_2CO_3$ means less alkalinity, which limits attack of gangue constituents. The autoclave discharge liquor's pH is about 11.1 at 180° C., 10.7 at 200° C., and 10.5 at 230° C., due to the lower amounts of $Na_2CO_3$ at the higher temperatures. For consistent combination of optimum results, the $Na_2CO_3/WO_3$ ratio is advantageously controlled at about 0.9:1 to 1.6:1, preferably about 1:1 to 1.4:1. It should be added that the presence of magnesium in the form of a magnesium-containing compound further aids in inhibiting the dissolution of silica. In this instance, the concentrate contained 5.2% Mg. By working under these conditions, silica dissolution is maintained below about 1000 ppm, preferably below about 500 ppm, e.g., below about 100 ppm.

It has been noted that by working at the higher temperature level, e.g., 230° C., less $Na_2CO_3$ is required. The digestion temperature of 230° C. is advantageous in that the amount of $H_2SO_4$ required for neutralization is decreased and likewise the amount of $Na_2SO_4$ for disposal in the raffinate. This is supported by the data in Table VII below.

TABLE VII

| Temp., °C. | Reagent Input (Output), kg/kg $WO_3$ for 99% Extraction | | |
|---|---|---|---|
| | $Na_2CO_3$ | $H_2SO_4$ | $Na_2SO_4$ |
| 180 | 1.7 | 1.0 | (2.0) |
| 200 | 1.4 | 0.7 | (1.6) |
| 230 | 1.2 | 0.5 | (1.3) |

Effect of $Na_2WO_4$ Concentration

The concentration of $Na_2WO_4$ attained in the pregnant liquor during digestion is important in providing high dissolution yields. The primary digestion reaction (Reaction 1) set forth hereinbefore involves both $Na_2CO_3$ and $Na_2WO_4$. Reaction 1 is reversible. As has been shown, by increasing $Na_2CO_3$ to $Na_2WO_4$ weight ratio, extraction is increased. Conversely, decreasing this ratio or increasing the amount of $Na_2WO_4$ in the pregnant liquor will have a negative effect on the extraction efficiency.

Thus, to assure consistently high dissolution yields, the tungsten concentration constraints can be minimized by leaching to not more than about 100 gpl $WO_3$, e.g., about 75 to 95 gpl, and, more preferably, over the range of approximately 90 to 95 gpl WO$_3$.

When tungsten ores or low-grade or high-grade tungsten concentrates are digested, the pregnant liquor containing the sodium tungstate is further treated following filtration to remove such impurities as molybdenum. Any excess sodium carbonate is neutralized with acid and the pH adjusted to that value required to effect precipitation of Mo as MoS$_3$ using sulfide ion as the precipitant. A process for removing molybdenum from the solution is disclosed and claimed in copending U.S. patent application Ser. No. 225,915, filed Jan. 19, 1981, which is incorporated herein by reference. It is important that the WO$_3$/Mo ratio in the purified solution be very high, for example, 20,000/1. To achieve this, the discharge pregnant solution should be at least about 100 gpl WO$_3$.

One method to achieve the foregoing requirements is to leach a final WO$_3$ concentration of less than 100 gpl, for example, to a range of about 75 to 95 gpl, more preferably, approximately 90 to 95 gpl, to obtain a high dissolution yield and then subject the discharge pregnant liquor to flash down to evaporate sufficient solution to increase the concentration of WO$_3$ in the pregnant liquor at least 10% and preferably at least about 15 or 20% of the original concentration to increase the WO$_3$ concentration to upwards of about 120 to 140 gpl. The advantages of this technique will be apparent as follows.

Effect of Autoclave Flashing

Digestion runs were carried out comparing a standard leach with the results obtained with a modified leach followed by flashing. As illustrative of the foregoing, the leaches were performed at 230° C. using a Na$_2$CO$_3$/WO$_3$ weight ratio of 1.2 for 2 hours.

In the case of the standard leach, the Na$_2$CO$_3$ concentration was 150 gpl to generate a pregnant solution containing 120 gpl WO$_3$ at 230° C. operating temperature, the pressure being in the neighborhood of about 400 psig (note FIG. 5).

In using the flashing procedure, the initial Na$_2$CO$_3$ concentration was 120 gpl to generate a pregnant liquor containing about 95 gpl WO$_3$ which, following flashing, was upgraded to about 115 to 120 gpl.

CanTung concentrates Nos. (III) to (X) were treated in this fashion, the results being shown in Table VI as follows:

TABLE VIII

| | Concentrate | | WO$_3$ Extraction, % | |
|---|---|---|---|---|
| Sample No. | Type | WO$_3$, % | Std. Leach | Flashing |
| (III) | Flotation | 14 | 98.8 | 99.6 |
| (IV) | " | 15 | 99.5 | 99.7 |
| (V) | " | 24 | 99.8 | 99.9 |
| (VI) | " | 27 | 99.5 | 99.7 |
| (VII) | Gravity | 29 | 97.7 | 99.0 |
| (VIII) | Flotation | 34 | 99.0 | 99.8 |
| (IX) | " | 65 | 97.7 | 99.7 |
| (X) | Gravity | 71 | 98.2 | 99.0 |

As will be observed, the more dilute pregnant liquor, that is, the final liquor containing 95 gpl WO$_3$ prior to flashing, gave consistently at least 99% dissolution yield. It will be noted that the invention is also applicable to the treatment of high-grade tungsten concentrates, such as Samples No. (IX) and (X). However, the invention finds particular use in the treatment of low-grade concentrates, such as those containing about 2% to 40% by weight WO$_3$.

In production, fine grinding of the ore or concentrate can increase the amount of tungsten that is solubilized under a given leach condition, although fine grinding can increase substantially the amount of the water in the filter cake. Concentrates having a particle size of minus 150 mesh can be treated. Preferably, the bulk of the material should be minus 325 mesh, with at least about 25% minus 400 mesh.

As flotation concentrates contain flotation oils, these oils should be removed, otherwise severe foaming during subsequent washing and filtration steps results following digestion. If allowed to remain, the organic carbon in solution eventually passes through to solvent extraction and will attack and degrade the organic amine, requiring periodic replacement of the organic solvent. By roasting the concentrate, the foaming problems in the filtration steps are eliminated, and the residual organic carbon, which may range from 50 to 2000 ppm, is reduced to a low level of about 5 to 15 ppm TOC (total organic carbon). The roasting temperature may range between 575° C. to 625° C. for maximum removal of organic carbon.

In the alternative, the addition of oxygen to the autoclave during soda ash digestion can effectively eliminate foaming problems during filtration. By conducting the digestion at about 250° C. at a pressure of 200 to 300 psig O$_2$ overpressure, the long-chained organics can be converted to smaller, non-smelling, non-foaming organics, such as formic acid, acetate, etc.

In summary, the process of the invention is particularly applicable to difficult-to-leach concentrates containing the following percent ingredients by weight:

| | |
|---|---|
| WO$_3$ | about 2% to 40% (e.g., 5% to 30%) |
| Mo | up to about 10% |
| F | up to about 10% |
| S | up to about 5% |
| CaO | up to about 30% |
| SiO$_2$ | about 2% to 50% |

The process is capable of treating such concentrates of average particle size passing through 150 mesh (U.S. Standard), with at least about 25% minus 400 mesh.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. A process for the soda digestion of scheelite concentrates containing by weight about 2% to 40% WO$_3$ and gangue minerals including at least about 2% silica which comprises:

forming a slurry of a scheelite concentrate in an aqueous sodium carbonate solution of an initial concentration ranging from about 50 gpl to 200 gpl at a Na$_2$CO$_3$/WO$_3$ weight ratio of about 0.9 to 1.6, and then digesting said slurry in an autoclave at an elevated pressure and at a temperature ranging from about 180° C. to 310° C.,
said digestion being such that the initial concentration of the Na$_2$CO$_3$ solution employed is substantially inversely correlated to the digestion temperature and substantially directly correlated to the $Na_2CO_3/WO_3$ weight ratio, such as to effect dissolution of at least about 95% of the $WO_3$ in the concentrate and provide a pregnant liquor containing substantially all of said $WO_3$ while inhibiting dissolution of gangue minerals.

2. The process of claim 1, wherein the concentration of $Na_2CO_3$ ranges from about 75 to 175 gpl, the $Na_2CO_3/WO_3$ weight ratio from about 1 to 1.4 and the temperature from about 200° C. to 250° C.

3. The process of claim 1, wherein the concentration of $Na_2CO_3$, the temperature and the $Na_2CO_3/WO_3$ weight ratio are correlated such as to control the $WO_3$ concentration in the pregnant solution following digestion to a level not exceeding about 100 gpl.

4. The process of claim 3, wherein the $WO_3$ concentration in the pregnant liquor following digestion is controlled to a level ranging from about 75 gpl to 95 gpl over a temperature range of about 200° C. to 250° C. and a pressure of about 225 psig to 575 psig.

5. The process of claim 3, wherein following substantially complete digestion of the $WO_3$ in the concentrate, the pregnant liquor is flashed to the atmosphere to effect evaporation of water from the pregnant liquor sufficient to increase the $WO_3$ concentration in said liquor by at least about 10% of the pregnant liquor concentration prior to flash down.

6. The process of claim 5, wherein the level of $WO_3$ in the pregnant liquor is approximately 90 to 95 gpl and the liquor thereafter is flashed to increase the $WO_3$ concentration by at least about 15% of the original concentration.

7. A process for the soda digestion of scheelite concentrates containing by weight about 2% to 40% $WO_3$ and gangue minerals including at least about 2% silica which comprises:

forming a slurry of said scheelite concentrate in an aqueous sodium carbonate solution of an initial concentration ranging from about 50 gpl to 200 gpl at a $Na_2CO_3/WO_3$ weight ratio of about 0.9 to 1.6, and then digesting said slurry in an autoclave in the presence of about 2% to 10% by weight of magnesium in the form of a magnesium-containing compound at an elevated pressure and at a temperature ranging from about 180° C. to 310° C., said digestion being such that the initial concentration of the $Na_2CO_3$ solution employed is substantially inversely correlated to the digestion temperature and substantially directly correlated to the $Na_2CO_3/WO_3$ weight ratio, such as to effect dissolution of at least about 95% of the $WO_3$ in the concentrate and provide a pregnant liquor containing substantially all of said $WO_3$ while inhibiting dissolution of gangue minerals.

8. The process of claim 7, wherein magnesium is present naturally as part of the gangue minerals.

9. The process of claim 7, wherein the concentration of $Na_2CO_3$ ranges from about 75 to 175 gpl, and $Na_2CO_3/WO_3$ weight ratio from about 1 to 1.4, the temperature from about 200° C. to 250° C. over a pressure ranging from about 225 to 575 psig, and wherein the presence of magnesium is due to the addition of dolomite, such that the dissolution of silica is inhibited to below 1000 ppm.

10. The process of claim 7, wherein the initial concentration of $Na_2CO_3$, the temperature and the $Na_2CO_3/WO_3$ weight ratio are correlated as stated in said claim, said correlation being such as to control the $WO_3$ concentration in the pregnant solution following digestion to a level not exceeding about 100 gpl.

11. The process of claim 10, wherein the $WO_3$ concentration in the pregnant liquor following digestion is controlled to a level ranging from about 75 gpl to 95 gpl over a temperature range of about 200° C. to 250° C. and a pressure of about 225 psig to 575 psig.

12. The process of claim 10, wherein following substantially complete digestion of the $WO_3$ in the low-grade concentrate, the pregnant liquor is flashed to the atmosphere to effect evaporation of water in the pregnant liquor sufficient to increase the $WO_3$ concentration in said liquor by at least about 10% of the pregnant liquor concentration prior to flash down.

13. The process of claim 12, wherein the level of $WO_3$ in the pregnant liquor is approximately 90 to 95 gpl and the liquor thereafter flashed to increase the $WO_3$ concentration by at least about 15% of the original concentration.

14. A process for the soda digestion of scheelite concentrates containing by weight about 2% to 40% $WO_3$ and gangue minerals including at least 2% silica which comprises:

forming a slurry of said scheelite concentrate in an aqueous sodium carbonate solution of a concentration ranging from about 50 gpl to 200 gpl at a $Na_2CO_3/WO_3$ weight ratio of about 0.9 to 1.6, digesting said slurry in an autoclave at an elevated pressure and at a temperature ranging from about 180° C. to 310° C. in the presence of about 2% to 10% by weight of magnesium in the form of a magnesium-containing compound, said digestion being such that the initial concentration of the $Na_2CO_3$ solution employed is substantially inversely correlated to the digestion temperature and substantially directly correlated to the $Na_2CO_3/WO_3$ weight ratio, such as to effect dissolution of at least about 95% of the $WO_3$ in the concentrate and provide a pregnant liquor containing said $WO_3$ at a concentration level not exceeding about 100 gpl while inhibiting dissolution of gangue minerals, and then flashing said pregnant liquor to the atmosphere to effect evaporation of water in the pregnant liquor sufficient to increase the $WO_3$ concentration in said liquor by at least 10% of the pregnant liquor prior to flash down.

15. The process of claim 14, wherein magnesium is present naturally as part of the gangue minerals.

16. The process of claim 14, wherein the concentration of $Na_2CO_3$ ranges from about 75 to 175 gpl, the $Na_2CO_3/WO_3$ weight ratio from about 1 to 1.4, the temperature from about 200° C. to 250° C., the pressure from about 225 psig to 575 psig, and wherein the presence of magnesium is due to the addition of dolomite, such that the dissolution of silica is inhibited to below 1000 ppm.

17. The process of claim 14, wherein the $WO_3$ concentration in the pregnant liquor following digestion is controlled to a level ranging from about 75 gpl to 95 gpl over a temperature range of about 200° C. to 250° C. and a pressure of about 225 psig to 575 psig.

18. The process of claim 17, wherein the level of $WO_3$ in the pregnant liquor is approximately 90 to 95 gpl and the flash down of said liquor is such as to increase the $WO_3$ concentration by at least about 15% of the original concentration.

* * * * *